United States Patent
Shah et al.

(10) Patent No.: US 10,136,465 B1
(45) Date of Patent: Nov. 20, 2018

(54) ENHANCED ACCESS CLASS BARRING MECHANISM IN LTE

(71) Applicant: Sprint Communications Company L.P., Overland Park, KS (US)

(72) Inventors: Maulik K. Shah, Overland Park, KS (US); Anoop Kumar Goyal, Overland Park, KS (US); Siddharth S. Oroskar, Overland Park, KS (US); Jasinder P. Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 23 days.

(21) Appl. No.: 15/007,479

(22) Filed: Jan. 27, 2016

Related U.S. Application Data

(63) Continuation of application No. 13/569,995, filed on Aug. 8, 2012, now Pat. No. 9,282,572.

(51) Int. Cl.
  *H04W 76/18* (2018.01)
  *H04W 72/10* (2009.01)
  *H04W 4/70* (2018.01)

(52) U.S. Cl.
  CPC ............. *H04W 76/18* (2018.02); *H04W 4/70* (2018.02); *H04W 72/10* (2013.01)

(58) Field of Classification Search
  None
  See application file for complete search history.

(56) References Cited

U.S. PATENT DOCUMENTS

| | | | |
|---|---|---|---|
| 9,282,572 B1* | 3/2016 | Shah | H04W 74/00 |
| 2012/0033613 A1* | 2/2012 | Lin | H04W 74/085 |
| | | | 370/328 |
| 2012/0039171 A1* | 2/2012 | Yamada | H04L 47/12 |
| | | | 370/232 |
| 2012/0063305 A1* | 3/2012 | Chiu | H04W 74/0833 |
| | | | 370/230 |
| 2013/0028184 A1* | 1/2013 | Lee | H04W 8/22 |
| | | | 370/328 |
| 2013/0035064 A1* | 2/2013 | Balachandran | H04W 48/02 |
| | | | 455/411 |
| 2013/0045706 A1* | 2/2013 | Hsu | H04W 4/005 |
| | | | 455/404.1 |
| 2013/0122906 A1* | 5/2013 | Klatt | H04W 48/02 |
| | | | 455/435.1 |
| 2013/0155994 A1* | 6/2013 | Yoshizawa | H04W 72/0406 |
| | | | 370/329 |

(Continued)

*Primary Examiner* — Michael J Moore, Jr.

(57) ABSTRACT

Systems, methods, and computer-readable media for providing enhanced access class barring in LTE are provided. In embodiments, the method includes receiving, on a mobile device, a SIB2 message. A barring factor associated with the SIB2 message is identified. In embodiments, the barring factor is dynamic based on traffic parameters associated with a network. An upper limit for a random number is set on the mobile device and the random number is generated. The random number is generated and compared to the barring factor. If the random number is less than the barring factor, access to the network is provided to the mobile device. In embodiments, an additional random number is generated for special users or devices if the random number is greater than or equal to the barring factor.

17 Claims, 3 Drawing Sheets

(56) References Cited

U.S. PATENT DOCUMENTS

2013/0170343 A1* 7/2013 Ye ........................ H04W 48/06
370/230
2014/0171096 A1* 6/2014 Hwang ................ H04W 48/02
455/452.1

* cited by examiner

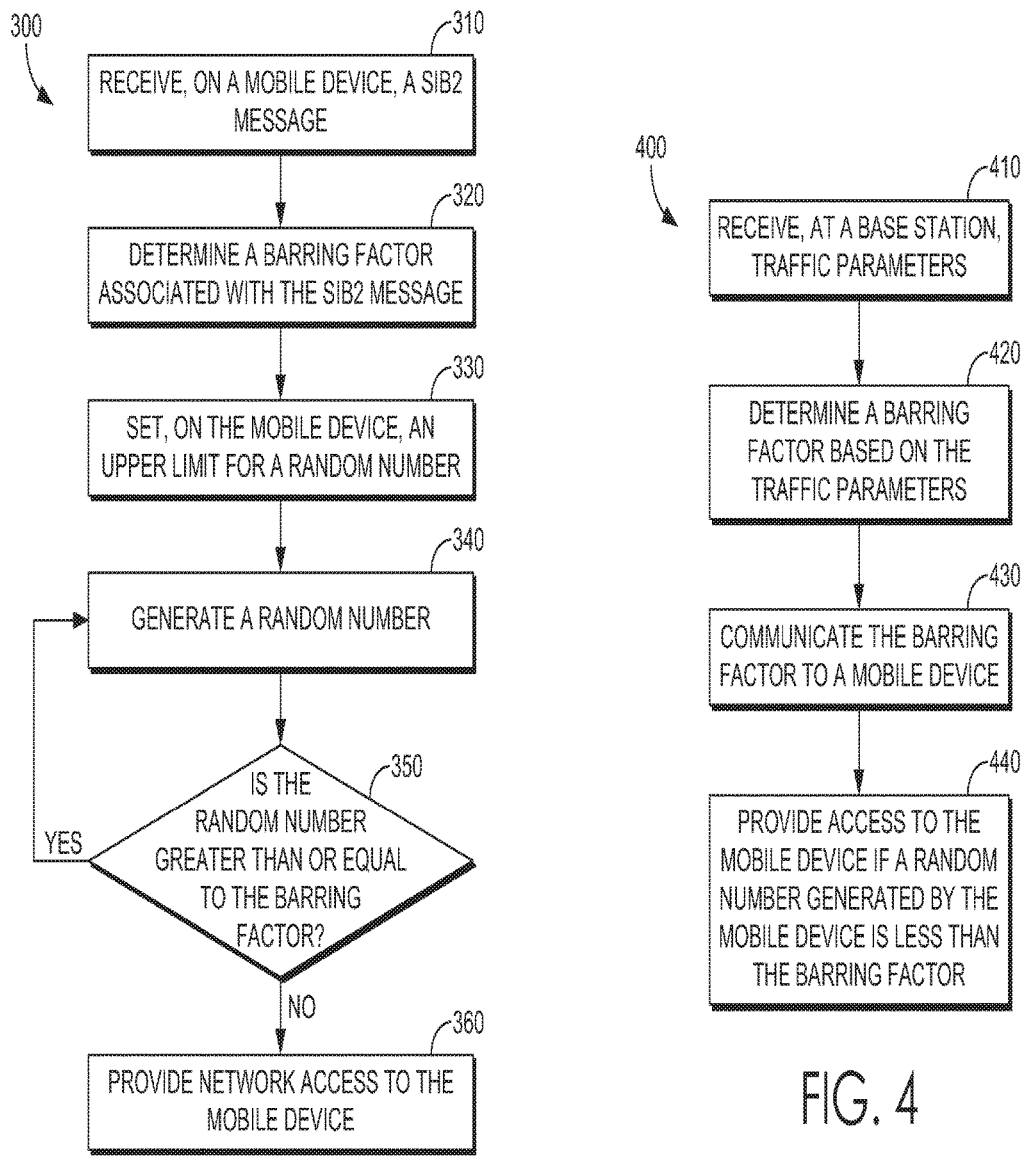

ENHANCED ACCESS CLASS BARRING MECHANISM IN LTE

CROSS-REFERENCE TO RELATED APPLICATIONS

This application is a continuation of co-pending U.S. Nonprovisional Patent Application No. 13/569,995, filed Aug. 8, 2012, also entitled "Enhanced Access Class Barring Mechanism in LTE,", the entirety of which is hereby incorporated by reference.

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter. In brief, and at a high level, this disclosure describes, among other things, providing an enhanced access class barring mechanism in long term evolution (LTE). In embodiments, a barring factor associated with a SIB2 message is dynamically adjusted based on traffic parameters associated with a network. In embodiments, an upper limit is set for a randomly generated number, generated by a mobile device, that is compared to the barring factor. The randomly generated number is compared to the barring factor and, if lower than the barring factor, the mobile device is provided access to the network. In embodiments, if the randomly generated number is greater than or equal to the barring factor, special users and devices generate an additional randomly generated number.

BRIEF DESCRIPTION OF THE SEVERAL VIEWS OF THE DRAWINGS

Illustrative embodiments of the present invention are described in detail below with reference to the attached drawing figures, and wherein:

FIG. 3 is a flow diagram depicting an illustrative method of setting an upper limit for a random number in accordance with embodiments of the invention; and FIG. 4 is a flow diagram depicting an illustrative method of determining a barring factor based on traffic parameters in accordance with embodiments of the invention.

DETAILED DESCRIPTION

Figure 1:
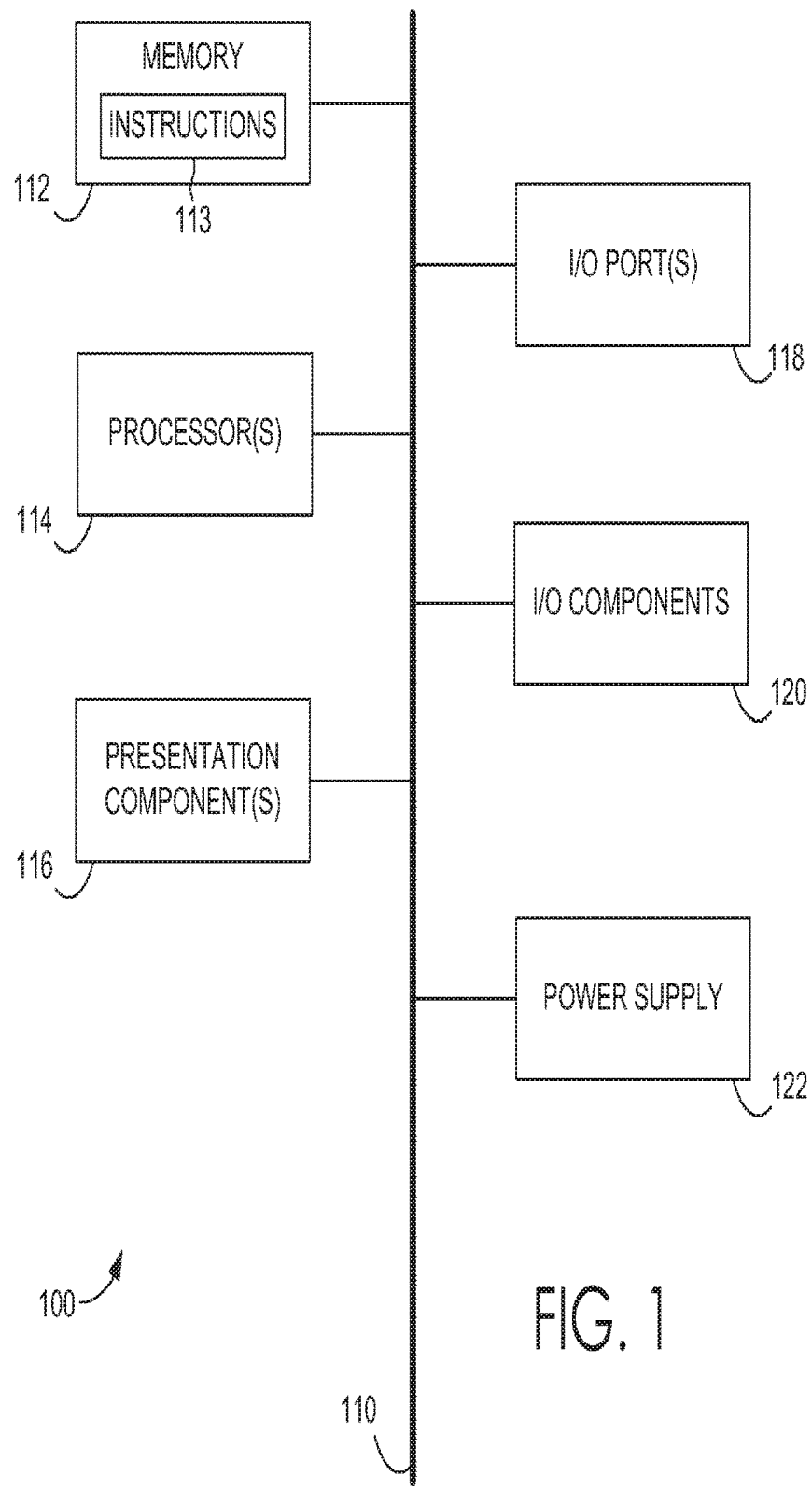
FIG. 1 depicts an illustrative device suitable for use in connection with embodiments of the invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention are directed provide one hundred percent or near-one hundred percent access to special users or devices (e.g. machine-to-machine). In embodiments, the mobile device sets an upper limit for a randomly generated number that is lower than the barring factor. In embodiments, devices associated with special users or machine-to-machine (M2M) devices generate additional randomly generated numbers until network access is provided. In embodiments, base stations dynamically set barring factors based on traffic parameters.

Accordingly, in one aspect, embodiments of the present invention are directed to one or more computer-readable storage media having computer-executable instructions embodied thereon that, when executed, perform a method of providing priority access to special users or devices. The method includes receiving, on a mobile device, a SIB2 message. A barring factor associated with the SIB2 message is determined. An upper limit is set for a random number on the mobile device. The random number is generated by the mobile device. The random number is compared to the barring factor. Access is provided to the mobile device if the random number is less than the barring factor.

In another aspect, embodiments of the present invention are directed to one or more computer-readable storage media having computer-executable instructions embodied thereon that, when executed, perform a method of providing access control by dynamically adjusting a barring factor according to network traffic. The method includes receiving, at a base station, traffic parameters associated with a network. A barring factor is determined based on the traffic parameters. The barring factor is communicated to a mobile device. Access to the network is provided to the mobile device if a random number generated by the mobile device is less than the barring factor.

In yet another aspect, embodiments of the present invention are directed to a system for providing access control for special users and devices. The system includes a receiving component for receiving a SIB2 message. A determining component determines a barring factor associated with the SIB2 message. A random number component generates a random number. A comparison component compares the random number to the barring factor. An access component provides access to a mobile device if the random number is less than the barring factor.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Telephone Technology
4G Fourth-Generation Wireless Telephone Technology
CDMA Code Division Multiple Access
CD-ROM Compact Disk Read Only Memory
CRM Customer Relations Management
DVD Digital Versatile Discs
EEPROM Electrically Erasable Programmable Read Only Memory
ENODEB Evolved Node B
GPRS General Packet Radio Service
GPS Global Positioning System GSM Global System for Mobile Communications
HLR Home Location Register
iDEN Integrated Digital Enhanced Network
LTE Long Term Evolution
MSC Mobile Serving Center
MMS Multimedia Messaging Service
PC Personal Computer
PCS Personal Communications Service
PDA Personal Digital Assistant
PLMN Public Land Mobile Network
RAM Random Access Memory
RF Radio Frequency
ROM Read Only Memory
SIB2 SystemInformationBlockType2
SLA Service Level Agreement
SMS Short Message Service
TDMA Time Division Multiple Access
UMTS Universal Mobile Telecommunications Systems
VoIP Voice over IP
Wi-Fi Wireless Fidelity
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and non-volatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
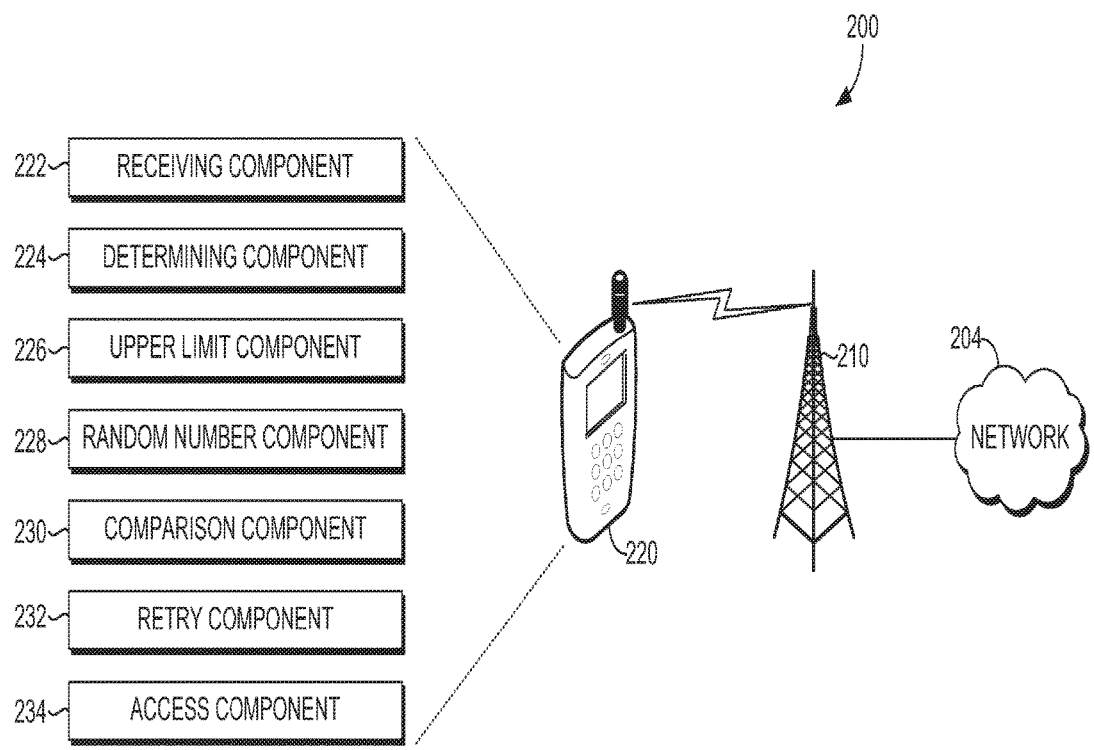
FIG. 2 is a schematic view of an exemplary network environment suitable for performing embodiments of the invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 220 may communicate with other devices, such as mobile devices, servers, etc. The user device 220 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 220 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 220 can utilize network 204 to communicate with other computing devices (e.g., a mobile device(s), a server(s), a personal computer(s), etc.). In embodiments, the network 204 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 204 can include multiple networks, as well as being a network of networks, but is shown in more simple form so as to not obscure other aspects of the present invention. The network 204 can be part of a telecommunication network that connects subscribers to their immediate service provider. In embodiments, the network 204 can be associated with a telecommunications provider that provides services to user devices, such as user device 220. For example, the network 204 may provide voice services to user devices or corresponding users that are registered or subscribed to utilize the services (e.g., the network 204) provided by a telecommunications provider. The network 204 can be any communication network providing voice and/or data service(s), such as, for example, a 1x circuit voice, a 3G network (e.g., CDMA, CDMA2000, WCDMA, GSM, UMTS), or a 4G network (WiMAX, LTE, HSDPA).

In LTE networks, the eNodeB 210 controls user access through a broadcast of access class barring parameters contained in a SIB2 message. Mobile devices 220 perform actions according to an access class. Regular users are associated with access classes 0-9. For these regular users, access is controlled by a barring factor. In order to access a particular network, the mobile device 220 must pass the "persistent test". A randomly generated number (i.e., random number) is generated by the mobile device 220. If that random number is less than the barring factor, the mobile device 220 is provided access to the network 204. Unfortunately, LTE networks utilize a static threshold defined by operators of the network. Because current algorithms to define the barring factor do not account for traffic parameters associated with a network, mobile devices are often barred even though network resources are available. Further, no preference or priority is given to special users or devices attempting to access the network.

In implementation, mobile device is associated with components that are utilized to facilitate accessing the network 204. The components include receiving component 222, determining component 224, upper limit component 226, random number component 228, comparison component 230, retry component 232, and access component 234.

Receiving component 222 receives a SIB2 message from the eNodeB 210. The SIB2 message contains a variety of information. Determining component 224 determines a barring factor associated with the SIB2 message. As described above, in one embodiment, the barring factor is a static threshold communicated by the eNodeB 210 that is controls access to the network 204. In another embodiment, the barring factor is dynamic and based on a load associated with a network. In this example, the barring factor is inversely proportional to traffic parameters associated with the network. This provides an increased likelihood that for a heavily loaded network, access will be barred. Similarly, for a lightly loaded network, there is an increased likelihood that access will be provided.

Random number component 228 generates a random number on the mobile device 220. In one embodiment, the mobile device is associated with a special user. The special user may be a high paying or high profile customer. In one embodiment, the mobile device is an M2M device.

The random number is compared to the barring factor by comparison component 230. If the random number is less than the barring factor, access component 234 provides access to the network 204 for the mobile device 220.

In one embodiment, an upper limit component sets an upper limit for the random number. After determining component 224 determines the barring factor associated with the SIB2 message, upper limit component sets the upper limit for the random number below the barring factor. This provides guaranteed or near-guaranteed access to the network 204 for the mobile device 220. The upper limit component 226 is utilized, for example, by special users (e.g., high paying users, important users, and the like) or devices (e.g., M2M).

In one embodiment, retry component 232 generates an additional random number if the random number is greater than or equal to the barring factor. Comparison component 230 compares the additional random number to the barring factor, and if the additional random number is less than the barring factor, access component 234 provides access to the network for the mobile device. Retry component 232 keeps generating additional random numbers until access is provided. For example, if upper limit component sets an upper limit equal to or above the barring factor and a special user or device is unable to access the network 204, retry component 232 allows the mobile device to continue attempting to access the network. Such a situation may occur if mobile device is within range of more than one eNodeB and receives the barring factor from one eNodeB but attempts to access a network associated with another eNodeB. It should be understood that regular users, in one embodiment, are only allotted one attempt within a predetermined amount of time.

Referring now to FIG. 3, a flow diagram depicts a method 300 of providing priority access to special users, in accordance with embodiments of the invention. At step 310, a SIB2 message is received on a mobile device. The SIB2 message is communicated by an eNodeB and contains a variety of information. In one embodiment, the mobile device is associated with a special user. In one embodiment, the mobile device is an M2M device.

A barring factor associated with the SIB2 message is determined at step 320 by the mobile device. At step 330, an upper limit for a random number is set. The random number is generated by the mobile device at step 340. At step 350, the random number is compared to the barring factor. If the random number is less than the barring factor, access is provided to the mobile device at step 360.

In one embodiment, for special users or devices (e.g., M2M), if the random number is greater than or equal to the barring factor, an additional random number is generated, at step 340, and the comparison is repeated at step 350. This process is continued until the additional random number is less than the barring factor and access is provided to the mobile device at step 360.

In one embodiment, the mobile device is not associated with a special user or device. In this example, if the random number is greater than or equal to the barring factor, the mobile device does not attempt to access the network again for a predetermined amount of time.

Referring now to FIG. 4, a flow diagram depicting an illustrative method 400 of providing access control by dynamically adjusting a barring factor according to traffic, in accordance with an embodiment of the present invention. Initially, at step 410, traffic parameters associated with a network are received at a base station (e.g., eNodeB). A barring factor is determined at step 420, based on the traffic parameters. The barring factor, in one embodiment, is inversely proportional to the load of traffic. Thus, as the traffic parameters increase (e.g., heavier load), the barring factor decreases. This increases the likelihood that under a heavy load, a device attempting to access the network will have a lower probability of accessing the network because the likelihood that the random number generated by the mobile device will be less than the barring factor decreases as the barring factor decreases.

The barring factor is communicated to a mobile device at step 430. Access is provided to the mobile device, at step 440, if a random number generated by the mobile device is less than the barring factor. In one embodiment, the barring factor is based on the mobile device. For example, if the base station detects that a special device (e.g., M2M) is attempting to access the network, the base station may provide a higher barring factor so the probability the device accesses the network increases. In another embodiment, the barring factor is based on a user associated with the mobile device. In this example, the base station detects that a special user is attempting to access the network. Similar to the above example, the base station provides a higher barring factor to increase the likelihood that the user is able to access the network.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. Non-transitory computer-readable media having computer-executable instructions embodied thereon that, when executed, perform a method of providing access control by dynamically adjusting a barring factor according to network traffic, the method comprising:
   receiving, at a base station, traffic parameters associated with a network;
   detecting, by the base station, that a special mobile device is requesting network access, wherein the special mobile device is associated with one or more users having priority access to the network;
   determining, based on the traffic parameters, a second barring factor for the special mobile device, the second barring factor being higher than a first barring factor for other mobile devices;
   receiving a first random number generated by the special mobile device;
   if the first random number is less than the second barring factor, providing network access to the special mobile device; and
   if the first random number is greater than or equal to the second barring factor,
      receiving a second random number generated by the special mobile device,
      comparing the second random number to the second barring factor, and
      providing network access to the special mobile device based on the second random number being less than the second barring factor.

2. The media of claim 1, wherein the special mobile device is associated with a special access class.

3. The media of claim 1, wherein the special mobile device is a machine-to-machine (M2M) device.

4. The media of claim 1, wherein the first barring factor and the second barring factor decrease as the traffic parameters increase.

5. The media of claim 4, wherein determining the second barring factor is further based on the special mobile device.

6. The media of claim 5, wherein determining the second barring factor is further based on a user associated with the special mobile device.

7. The media of claim 1, wherein the special mobile device is permitted to immediately attempt to access the network again.

8. A method of providing access control by dynamically adjusting a barring factor according to network traffic, the method comprising:
   receiving, at a base station, traffic parameters associated with a network;
   detecting, by the base station, that a special mobile device is requesting network access, wherein the special mobile device is associated with one or more users having priority access to the network;
   generating a first barring factor based on the traffic parameters for the special mobile device;
   receiving a first random number generated by the special mobile device;
   if the first random number is less than the first barring factor, providing network access to the special mobile device; and
   if the first random number is greater than the first barring factor,
      denying network access to the special mobile device,
      receiving a second random number generated by the special mobile device,
      comparing the second random number to the first barring factor, and
      providing network access to the special mobile device based on the second random number being less than the first barring factor.

9. The method of claim 8, wherein the first barring factor decreases as the traffic parameters increase.

10. The method of claim 8, wherein determining the first barring factor is further based on the mobile device.

11. The method of claim 8, wherein determining the first barring factor is further based on a user associated with the mobile device.

12. A system for providing access control for special users and devices in a wireless network, the system comprising:
   a processor; and
   one or more computer storage hardware devices storing computer-usable instructions that, when used by the processor, cause the processor to:
   receive, by a base station, traffic parameters associated with a network;
   determine a first barring factor based on the traffic parameters;
   receive, by the base station, a network access request from a special mobile device, wherein the special mobile device is associated with one or more users having priority access to the network; and
   determine a second barring factor for the special mobile device, the second barring factor being higher than the first barring factor;
   communicate, by the base station, the second barring factor to the special mobile device;
   receive a first random number generated by the special mobile device; and if the first random number is less than the second barring factor, provide network access to the special mobile device; and if the first random number is greater than or equal to the second barring factor,
- receive a second random number generated by the special mobile device,
- compare the second random number to the second barring factor, and
- provide network access to the special mobile device based on the second random number being less than the second barring factor.

13. The system of claim 12, wherein the special mobile device is associated with a special access class.

14. The system of claim 12, wherein the first barring factor and second barring factor are dynamic and based on a load associated with a network.

15. The system of claim 12, wherein the first barring factor and the second barring factor decrease as the traffic parameters increase.

16. The system of claim 12, wherein determining the second barring factor is further based on the special mobile device.

17. The system of claim 12, wherein the special mobile device is a machine-to-machine (M2M) device.

* * * * *